United States Patent Office 3,073,817
Patented Jan. 15, 1963

3,073,817
METHOD FOR PRODUCING DIHYDROXYPROGESTERONE DERIVATIVES
Patrick A. Diassi, Westfield, and Josef Fried, Princeton, N.J., assignors to Olin Mathieson Chemical Corporation, New York, N.Y., a corporation of Virginia
No Drawing. Filed Oct. 9, 1961, Ser. No. 143,607
10 Claims. (Cl. 260—239.55)

This invention relates to an improved process for the production of compounds of the formula (I)
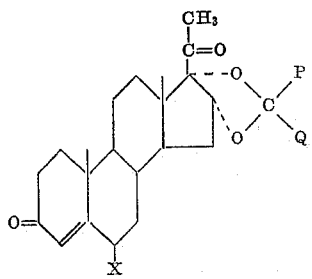

and to novel intermediates produced in the process.

X in the above formula represents the halogens chlorine and bromine. P represents hydrogen and hydrocarbon and heterocyclic groups which are defined hereinafter. Q represents hydrocarbon or heterocyclic groups like those represented by P. P and Q may also join with the carbon to which they are attached to form a cyclic group also defined below.

In previous efforts to synthesize compounds of Formula I, one or more steps in the processes have encountered difficulties. These difficulties have been in the nature of either poor yields or inability to carry through the particular sequence with all types of substituent groups including the destruction or removal of substituent groups in the molecule. The process of this invention employs a particular sequence of steps which are readily carried out, give high yields and may be applied to materials having a wide variety of substituent groups without loss or destruction of those groups during the processing.

According to this invention 16α,17α-dihydroxyprogesterone is used as a starting material. This compound is reacted with a lower alkyl ortho ester of formic acid to give the lower alkyl enol ether, lower alkyl ortho ester of the formula (II)
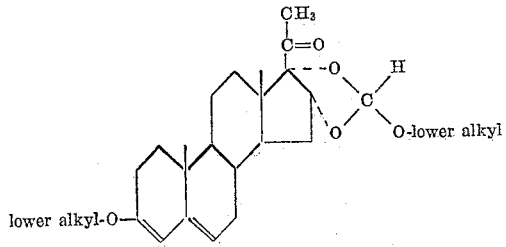

The reaction of 16α,17α-dihydroxyprogesterone with the ortho formate is effected in an inert organic solvent, such as dioxane, ether, acetone or the like in the presence of a trace of a Lewis acid such as sulfuric, perchloric or p-toluenesulfonic acid.

The compound of Formula II is then reacted with N-chlorosuccinimide or N-bromosuccinimide in a mildly acidic buffer such as acetic acid-sodium acetate to obtain the 6β-chloro or 6β-bromo compound of the formula (III)
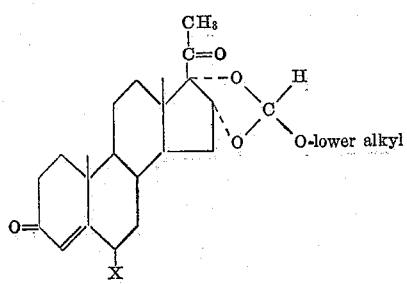

Reaction of the compound of Formula III with a very dilute solution of a Lewis acid such as hydrochloric acid, perchloric acid or the like converts the former to the 6β-chloro or 6β-bromo-16α,17α-dihydroxyprogesterone of the formula (IV)
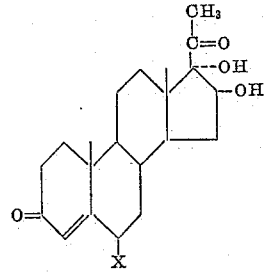

The compound of Formula IV may then be reacted with the aldehydes or ketones described below to yield compounds of Formula I. The acetalization or ketalization is preferably carried out by treating a suspension or solution of the dihydroxy compound of Formula IV in the aldehyde or ketone (or in an organic solvent for the aldehyde or ketone if the latter are solid) with an acid catalyst such as perchloric acid, p-toluenesulfonic acid, hydrochloric acid, etc., neutralizing the acid, and recovering the acetal or ketal compound of Formula I.

The products of Formula I are physiologically active substances which possess progestational activity when administered either orally or parenterally and therefore are useful in the treatment of such conditions as habitual or threatened abortion. They may be administered in dosage forms such as tablets, capsules, elixirs, injectables and the like according to conventional practice.

By following the particular sequence of process steps outlined above 16α,17α-dihydroxyprogesterone may be readily converted in a high yield to the chlorinated or brominated products of Formula I. The intermediate products may be isolated or the reaction mixture containing the intermediate may be immediately used in the subsequent step in the synthesis.

The symbol P in Formula I above represents hydrogen or the moiety of an acetal or ketal, e.g. lower alkyl, halo lower alkyl, monocyclic aryl, monocyclic aryl lower alkyl, monocyclic heterocyclic or monocyclic heterocyclic lower alkyl. Q represents the same acetal or ketal moieties. In addition P and Q may join with the carbon to which they are attached to form a monocyclic cycloalkyl or monocyclic heterocyclic radical.

Suitable aldehyde and ketone reactants which may be reacted with the dihydroxy compounds of Formula IV to obtain the products of Formula I include lower alkanals of at least two carbon atoms, such as paraldehyde, propanal and hexanal; di(lower alkyl)ketones, such as acetone, diethylketone, dibutylketone, methylethylketone, and methylisobutylketone; cycloalkanones, such as cyclobutanone, cyclopentanone, cyclohexanone, suberone, and cyclohexanone; cycloalkyl (lower alkanals), such as cyclopropylcarboxaldehyde, cyclobutylcarboxaldehyde, cyclopentylcarboxaldehyde, cyclohexylcarboxaldehyde, cycloheptylcarboxaldehyde, cyclooctylcarboxaldehyde, cyclopropylacetaldehyde, cyclobutylacetaldehyde, cyclopentylacetaldehyde, cyclohexylacetaldehyde, β-cyclopentylpropionaldehyde, γ-cyclohexylbutyraldehyde, and 3-cyclopropylcaproaldehype; cycloalkyl (lower alkanones), such as cyclopropyl methyl ketone, cyclobutyl ethyl ketone, cyclopentyl propyl ketone, cyclopentylmethyl methyl ketone, cyclohexylmethyl ethyl ketone, cyclopentylethyl ethyl ketone, cyclopropylpropyl methyl ketone, cyclohexyl n-pentyl ketone, cyclohexyl methyl ketone, and cyclooctyl methyl ketone; dicycloalkyl ketones, such as dicyclopropyl ketone, dicyclobutyl ketone, dicyclopentyl ketone, dicyclohexyl ketone, cyclopentyl cyclohexyl ketone, cyclopropylmethyl cyclopropyl ketone, 2-cyclobutyl ethyl cyclopropyl ketone, 3-cyclopentylmethyl cyclopentyl ketone, 5-cyclohexylhexyl cyclohexyl ketone, di(cyclopentylmethyl)ketone, cyclohexylmethyl cyclopentyl ketone and di(4-cyclohexylpentyl)ketone; cycloalkyl monocyclic aromatic ketones, such as cyclopropyl phenyl ketone, cyclohexyl p-chlorophenyl ketone, cyclopentyl o-methoxyphenyl ketone, cyclopentyl, o,p-dihydroxyphenyl ketone, cyclohexyl m-tolyl ketone, cyclopropyl p-ethylphenyl ketone, cyclopropyl p-nitrophenyl ketone, and cyclohexyl p-acetamidophenyl ketone; cycloalkyl(lower alkyl)monocyclic aromatic ketones, such as cyclopentylmethyl phenyl ketone; cycloalkyl monocyclic aromatic (lower alkyl) ketones, such as cyclopentyl benzyl ketone, cyclohexyl phenethyl ketone, and cyclobutyl benzyl ketone; cycloalkyl (lower alkyl)monocyclic aromatic (lower alkyl) ketones, such as cyclopentylmethyl benzyl ketones; cycloalkyl monocyclic heterocyclic ketones, such as cyclopentyl 2-furyl ketone, cyclohexyl 2-thienyl ketone, and cyclopropyl 2-pyridinyl ketone; cycloalkyl (lower alkyl)monocyclic heterocyclic ketones, such as cyclopentylmethyl 2-piperidinyl ketone, cyclohexylethyl 2-morpholinyl ketone and cyclopropyl 2-thienyl ketone; cycloalkyl monocyclic heterocyclic (lower alkyl) ketones, such as cyclopentyl-2-thienyl ketone, cyclohexyl furfuryl ketone and cyclopropyl 2-piperidinylmethyl ketone; halo-lower alkanals, such as chloral hydrate, trifluoroacetaldehyde hemiacetal, and heptafluorobutanal ethyl hemiacetal; halo-lower alkanones, such as 1,1,1-trifluoroacetone; monocyclic carbocyclic aromatic aldehydes, such as benzaldehyde, halobenzaldehydes (e.g. p-chlorobenzaldehyde and p-fluorobenzaldehyde), lower alkoxybenzaldehydes (e.g. o-anisaldehyde), di(lower alkoxy)benzaldehydes (e.g. veratraldehyde), hydroxybenzaldehydes (e.g. salicylaldehyde), dihydroxybenzaldehydes (e.g. resorcylaldehyde), lower alkyl benzaldehydes (e.g. m-tolualdehyde and p-ethylbenzaldehyde), di(lower alkyl)benzaldehydes (e.g. o,p-dimethylbenzaldehyde), nitrobenzaldehydes, acylamidobenzaldehydes (e.g. N-acetylanthranilaldehyde), and cyanobenzaldehydes; monocyclic carboxylic aromatic lower alkanals, such as phenylacetaldehyde, α-phenylpropionaldehyde, β-phenylpropionaldehyde, γ-phenylbutyraldehyde, and aromatically-substituted halo lower alkoxy, hydroxy, lower alkyl, nitro, acylamido and cyano derivatives thereof; monocyclic heterocyclic aldehydes, such as picolinaldehydes, furfural, thiophene carbonals, and halo, lower alkoxy, hydroxy, lower alkyl, nitro, and cyano derivatives thereof; monocyclic heterocyclic lower alkanals, monocyclic carbocyclic aromatic ketones, such as acetophenone, α,α,α-trifluoroacetophenone, propiophenone, butyrophenone, valerophenone, isocaprophenone, halophenyl lower alkyl ketones (e.g. p-chloroacetophenone and p-chloropropiophenone), (lower alkoxy) phenyl lower alkyl ketones (e.g. p-anisyl methyl ketone), di(lower alkoxy)phenyl lower alkyl ketones, hydroxyphenyl lower alkyl ketones, dihydroxyphenyl lower alkyl ketones (e.g. resacetophenone), (lower alkyl)phenyl lower alkyl ketones (e.g. methyl p-tolyl ketone), di(lower alkyl)-phenyl lower alkyl ketones (o,p-xylyl methyl ketone), nitrophenyl lower alkyl ketones (e.g. p-nitroacetophenone), acylamidophenyl lower alkyl ketones, (e.g. acetyl anilines), and cyanophenyl lower alkyl ketones; benzophenone, and mono or bis substituted halo, lower alkoxy, hydroxy, lower alkyl, nitro, acylamido and cyano derivatives thereof; monocyclic carbocyclic aromatic lower alkanones, such as 1-phenyl-3-butanone and 1-phenyl-4-pentanone, and aromatically substituted derivatives thereof; monocyclic heterocyclic ketones, such as 2-acetylfuran, 2-benzoylfuran, 2-acetylthiophene and alloxan; and monocyclic heterocyclic lower alkanones.

The following examples are illustrative of the process of this invention. All temperatures are expressed in degrees centigrade.

EXAMPLE 1

*3-Ethoxy-16α,17α-Ethoxymethylenedioxy-$\Delta^{3,5}$-Pregnadiene-20-One*

To a suspension of 5.0 g. of 16α,17α-dihydroxyprogesterone in a mixture of 38 ml. of dioxane, 0.5 ml. of absolute ethanol and 5.0 ml. of ethyl orthoformate 3.5 ml. of a dioxane solution containing 0.18 ml. of sulfuric acid are added. Within a minute the steroid dissolves completely and after another minute the product begins to separate from solution as crystals. The suspension is stirred for 20 minutes, then 2.0 ml. of pyridine are added and the mixture diluted with 30 ml. of water. The crystals are filtered, washed with methanol-water (1:1) and dried to give 5.0 g. of 3-ethoxy-16α,17α-ethoxymethylenedioxy-$\Delta^{3,5}$-pregnadiene-20-one having a melting point 223–225°;

$[\alpha]_D^{23}$ −63° (chlf.); $\lambda_{max}^{Nujol}$ 5.83, 6.05, 6.14μ; $\lambda_{max}^{alc.}$.

*Analysis.*—Calcd. for $C_{26}H_{38}O_5$ (430.56): C, 72.52; H, 8.90; 2OC$_2$H$_5$, 20.94. Found: C, 72.53; H, 8.59; OC$_2$H$_5$, 19.95.

EXAMPLE 2

*6β-Chloro-16α,17α-Ethoxymethylenedioxyprogesterone*

To a stirred suspension of 300 mg. (0.697 mmol) of 3-ethoxy - 16α,17α - ethoxymethylenedioxy - $\Delta^{3,5}$ - pregnadiene-20-one in 10 ml. of dioxane a solution of 94 mg. (0.75 mmol) of N-chlorosuccinimide in 2 ml. of dioxane are added followed by 4.0 ml. of a buffer containing 6.6 g. of sodium acetate and 6.6 ml. of acetic acid per 100 ml. of solution. The mixture is stirred at room temperature for 45 minutes during which time the steroid dissolves. Addition of water to the solution gives crystals which are filtered, washed with water and dried. Recrystallization from acetone-hexane gives 140 mg. of 6β-chloro-16α,17α-ethoxymethylenedioxyprogesterone having a melting point 191–193°;

$[\alpha]_D^{22}$ +54° (chlf.); $\lambda_{max}^{alc.}$ 238 mμ ($\epsilon$ =15,200); 5.85, 5.93, 6.20μ

*Anal.*—Calcd. for $C_{24}H_{33}O_5Cl$ (436.95): C, 65.89; H, 7.61; 1OC$_2$H$_5$, 10.31; Cl, 8.11. Found: C, 66.78; H, 7.51; OC$_2$H$_5$, 9.68; Cl, 8.31.

EXAMPLE 3

*6β-Chloro-16α,17α-Dihydroxyprogesterone*

To a solution of 100 mg. of 6β-chloro-16α,17α-ethoxymethylenedioxyprogesterone in 9 ml. of methanol and 1 ml. of water, 0.1 ml. of conc. hydrochloric acid is added and the solution stirred at room temperature for 5 hours. Slow dilution with water gives a crystalline precipitate which is filtered, washed with water and dried. Recrystallization from acetone-hexane gives 55 mg. of 6β-chloro-16α,17α-dihydroxyprogesterone having M.P. 210–212°;

$[\alpha]_D^{22}$ +11°; $\lambda_{max.}^{alc.}$ 237 mμ ($\epsilon$ =15,200); $\lambda_{max.}^{Nujol}$ 2.90, 5.88, 6.00, 6.20μ

EXAMPLE 4

*6β-Chloro-16α,17α-Dihydroxyprogesterone 16α,17α-Acetonide*

A solution of 25 mg. of 6β-chloro-16α,17α-dihydroxyprogesterone in 1.5 ml. of acetone containing 0.001 ml. of perchloric acid (70%) is left at room temperature for 2 hours. After neutralization with dilute sodium bicarbonate the solution is diluted with water and the precipitate filtered, washed with water and dried to give 27 mg. of 6β-chloro-16α,17α-dihydroxyprogesterone 16α,17α-acetonide.

EXAMPLE 5

By substituting N-bromosuccinimide for the N-chlorosuccinimide in the procedure of Example 2 and continuing according to the procedure of Examples 3 and 4, there are obtained 6β-bromo-16α,17α-ethoxymethylenedioxyprogesterone, 6β-bromo-16α,17α-dihydroxyprogesterone and 6β-bromo-16α,17α-dihydroxyprogesterone 16,17-acetonide, respectively.

EXAMPLE 6

By substituting acetophenone for the acetone in Example 4, there is obtained the 16α,17α-acetophenone derivative of 6β-chloro-16α,17α-dihydroxyprogesterone.

EXAMPLE 7

By substituting monofluoroacetone for the acetone in Example 4, there is obtained the 16α,17α-monofluoroacetone derivative of 6β-chloro-16α,17α-dihydroxyprogesterone.

By similarly using either N-chlorosuccinimide or N-bromosuccinimide according to the procedure of Examples 2 or 5 and substituting any of the other aldehydes or ketones referred to (see column 3, line 1, to column 4, line 19) above for the acetone in the procedure of Example 4 the corresponding 6β-chloro- or 6β-bromo-16α,17α-dihydroxyprogesterone derivatives are obtained.

What is claimed is:
1. A process for the production of compounds of the formula

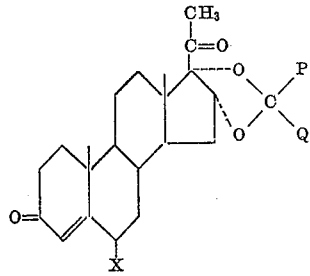

wherein X is a member of the group consisting of chlorine and bromine and P is a member of the group consisting of hydrogen, lower alkyl, halo lower alkyl, monocyclic lower alkyl, monocyclic cycloalkyl lower alkyl, monocyclic aryl, monocyclic aryl lower alkyl, monocyclic heterocyclic and monocyclic heterocyclic lower alkyl, and Q is a member of the group consisting of lower alkyl, halo lower alkyl, monocyclic cycloalkyl, monocyclic cycloalkyl lower alkyl, monocyclic aryl, monocyclic aryl lower alkyl, monocyclic heterocyclic and monocyclic heterocyclic lower alkyl, and together with the carbon to which they are joined P and Q are selected from the group consisting of monocyclic cycloalkyl and monocyclic heterocyclic, which comprises reacting 16α,17α-dihydroxyprogesterone with a lower alkyl ortho ester of formic acid to produce the lower alkyl enol ether, lower alkyl, ortho ester of said 16α,17α-dihydroxyprogesterone, reacting the latter with a member of the group consisting of N-chlorosuccinimide and N-bromosuccinimide in a buffer, treating the reaction product with a dilute acid solution and reacting the dihydroxyprogesterone product with a compound of the formula

wherein P and Q are as above defined.

2. A process which comprises reacting 16α,17α-dihydroxyprogesterone with ethyl orthoformate to obtain 3-ethoxy - 16α,17α - ethoxymethylenedioxy - $\Delta^{3,5}$ - pregnadiene-20-one, reacting the last named compound with N-chlorosuccinimide to obtain 6β-chloro-16α,17α-ethoxymethylenedioxyprogesterone, treating the last named compound with dilute mineral acid to obtain 6β-chloro-16α,17α-dihydroxyprogesterone and ketalizing the last named product with acetone to obtain 6β-chloro-16α,17α-dihydroxyprogesterone 16,17-acetonide.

3. A process which comprises reacting 16α,17α-dihydroxyprogesterone with ethyl orthoformate to obtain 3-ethoxy - 16α,17α - ethoxymethylenedioxy - $\Delta^{3,5}$ - pregnadiene-20-one, reacting the last named compound with N-bromosuccinimide to obtain 6β-bromo-16α,17α-ethoxymethylenedioxyprogesterone, treating the last named compound with dilute mineral acid to obtain 6β-bromo-16α,17α-dihydroxyprogesterone and ketalizing the last named product with acetone to obtain 6β-bromo-16α,17α-dihydroxyprogesterone 16,17-acetonide.

4. A compound of the formula

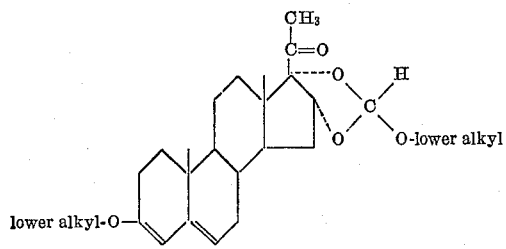

5. 3 - ethoxy - 16α,17α - ethoxymethylenedioxy - $\Delta^{3,5}$-pregnadiene 20-one.

6. A compound of the formula

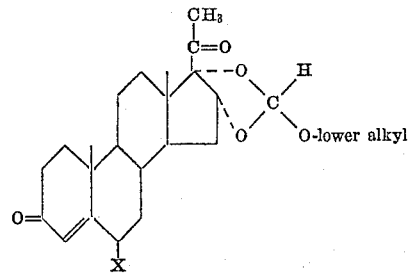

wherein X is a member of the group consisting of chlorine and bromine.

7. 6β - chloro - 16α,17α - ethoxymethylenedioxyprogesterone.

8. 6β - bromo - 16α,17α - ethoxymethylenedioxyprogesterone.

9. 6β-chloro-16α,17α-dihydroxyprogesterone.

10. 6β-bromo-16α,17α-dihydroxyprogesterone.

No references cited.